United States Patent [19]

Gold

[11] 4,423,943

[45] Jan. 3, 1984

[54] PHOTOGRAPHIC FILM ASSEMBLAGE HAVING A NON-LIGHTTIGHT FILM WITHDRAWAL OPENING

[75] Inventor: Nicholas Gold, Arlington, Mass.

[73] Assignee: Polaroid Corporation, Cambridge, Mass.

[21] Appl. No.: 364,804

[22] Filed: Apr. 2, 1982

[51] Int. Cl.³ .............................................. G03B 17/26
[52] U.S. Cl. .................................. 354/275; 242/71.1
[58] Field of Search ............. 354/275; 242/71.1, 71.7, 242/71

[56] References Cited

U.S. PATENT DOCUMENTS

| | | | |
|---|---|---|---|
| 2,176,507 | 10/1939 | Nagel | 242/71.1 |
| 2,541,476 | 2/1951 | Mihalyi | 242/71 |
| 3,261,237 | 7/1966 | Sentiff | 81/3 |
| 3,695,160 | 10/1972 | Stockdale | 242/71.1 |
| 3,705,696 | 12/1972 | Edwards et al. | 242/71.2 |
| 3,864,993 | 2/1975 | Hovind | 81/3 R |
| 4,034,393 | 7/1977 | Goldmacher | 354/354 |
| 4,047,653 | 9/1977 | Starr | 226/92 |
| 4,145,133 | 3/1979 | Wareham | 354/275 |
| 4,212,527 | 7/1980 | Fischer | 354/275 |
| 4,335,948 | 6/1982 | Cocco | 354/275 |

FOREIGN PATENT DOCUMENTS

WO80/01960  9/1980  PCT Int'l Appl. .

*Primary Examiner*—A. A. Mathews
*Attorney, Agent, or Firm*—Alfred E. Corrigan

[57] ABSTRACT

A photographic film assemblage including a film spool about which is wound a length of film, a housing for rotatably supporting the film spool such that a leading end of the film may be advanced to the exterior of the housing via a film withdrawal opening or passageway in the housing, and means for protecting the film from exposure by ambient light which passes freely through the passageway. The passageway is constructed such that relative rotation between the film spool and the housing, in a given direction, is all that is needed to move the leading end of the film to the exterior of the housing via the passageway.

3 Claims, 3 Drawing Figures

PHOTOGRAPHIC FILM ASSEMBLAGE HAVING A NON-LIGHTTIGHT FILM WITHDRAWAL OPENING

RELATED APPLICATION

This application relates to an improvement over the invention described in the copending application Ser. No. 251,142, filed Apr. 6, 1981, by Vincent L. Cocco, and entitled "Film Retriever," now U.S. Pat. No. 4,335,948.

BACKGROUND OF THE INVENTION

1. Field of the Invention

The invention relates to a photographic film assemblage having means for enabling a leading end of a strip of film to be easily retrieved or moved from within a film cassette.

2. Description of the Prior Art

The present invention relates to a photographic film assemblage of the type including a housing having an exit through which a leading end of a strip of film is adapted to be moved to the exterior of the housing so as to attach it to a film advance mechanism of a camera or film processor and, more particularly, to such an assemblage which includes means for retrieving such leading end should it be inadvertently, or otherwise, located within the housing.

Among amateur and professional photographers, one of the most popular film formats is the 35 millimeter size. In the 35 millimeter system, the film is normally carried on a spool within a lighttight cylindrical cassette. The spool is driven at one end of the cassette and the film passes through an exit in the cylindrical wall of the cassette as the film is rewound into the cassette. The facing edges of the exit are provided with black plush to provide a light seal when nothing is passing through the exit. The light seal is improved further because the height of the exit is small to minimize light passage.

This system has the disadvantage that, when the cassette is to be removed from the camera, the film must first be wound back into the cassette to avoid exposure to light. Several 35 millimeter cameras do not provide any accurate method of rewinding the film without causing the leading end of the film (the leader) to pass through the exit into the cassette. Once the leader is in the cassette, it is very difficult to retrieve it in order to process the film or to use any unexposed portions of the film at a later time.

This loss of the leader or leading end of the film occurs in two very different situations. When the roll of film is completely used, the film is wound back into the cassette, and it is desirable to have the leader available to remove the film from the cassette for processing. If the leader is not available, the cassette can be broken open to allow removal of the film. While this approach can be somewhat difficult and inconvenient for both the amateur and commercial processor, it is a viable solution. The leader is also lost in the situation where the photographer has partially used a roll of film and desires to change to another type of film. The photographer must return the original film to the interior of the cassette; and, in doing so, the leader is often lost. If the photographer does not wish to waste the remainder of the original roll of film, he must somehow retrieve the leader. He may, of course, break open the cassette, which must be done in a dark room, but in the process, often ruins the cassette so that the film cannot be used without obtaining a new cassette.

Some have attempted to obviate this problem by preventing the leading end of the film from being fully rewound into the film cassette in the first place. For example, the film cartridges disclosed in U.S. Pat. Nos. 3,695,160 and 3,705,696 are each provided with an integrally-molded projection, which is adapted to enter a perforation in the trailing end of a filmstrip to thereby preclude its entry into a take-up chamber. See also U.S. Pat. Nos. 4,145,133 and 4,212,527, wherein the leading end of a filmstrip is disfigured in a manner to preclude its entry into a film cassette. Also, see U.S. Pat. No. 4,034,393 wherein a hook is secured to the leading end of the film to prevent its movement into a film cassette. While these proposed solutions may have certain attributes, they are subject to the criticism that they may result in the filmstrip being torn, or otherwise damaged, if one were to continue to try to rewind the filmstrip after it had been stopped; and, such continued rewinding may damage the rewinding mechanism of the camera in which the film is located.

Others have recognized the value of being able to retrieve the leading end of the film without ruining the film, the cassette and/or the camera. For example, U.S. Pat. No. 3,261,237 describes a tool which can reach into the film cassette and retrieve the leading end of the film. U.S. Pat. Nos. 3,864,993 and 4,047,653 describe similar tools. However, these tools require proper manipulation and are subject to being misplaced in the workshop.

As is well known, the leading end of a roll of 35 mm film is generally located outside of the film cassette such that it may be readily attached to the film advance mechanism of a camera. However, this increases the chances that the film may be prematurely exposed due to the leading end of the film being inadvertently pulled so as to withdraw a larger length of film than usual prior to the film being loaded into a camera. Another disadvantage in having the leading end of the film originally located exteriorly of the film cassette is that one or more layers of the film may be formed of a material, such as polyester film, which is capable of "lightgripping", i.e., transmitting light along its length so as to eventually fog an adjacent photosensitive layer. Accordingly, ambient light striking an exteriorly located leading end of a length of film would be transmitted by the polyester film to the interior of the film cassette where it may fog the photosensitive layer of the film. Thus, the intensity of the ambient light incident upon the light transmitting layer and/or the period of time of exposure to such light are factors which could result in the fogging of the film.

SUMMARY OF THE INVENTION

The instant invention relates to a photographic film assemblage, preferably of the type adapted for use in handheld cameras of the 35 mm type and, more particularly, to such an assemblage which is constructed such that a leading end of a roll of film may be easily moved to the exterior of a housing where it may be manually grasped so as to attach it to a film advance mechanism of a camera or film processor.

The photographic film assemblage includes a film spool having a pair of spaced annular collars each of which has an annular flange extending at a right angle to the periphery of its respective collar. A strip of photographic film is wound about the film spool such that the lateral edges of the roll of film are confined between the inwardly facing surfaces of the collars, and the annular flanges overlie the lateral sides of the outermost convolution of the roll of film so as to fix the maximum diameter of the roll of film and to prevent it from clock-springing. The trailing end of the film is secured to the film spool and a leading end (leader) of the film is configured so as not to be confined by the annular flanges.

The film assemblage further includes a housing which is adapted to enclose the film spool and the film. The housing has a film withdrawal opening or passageway through which the film is adapted to be withdrawn. The width of the passageway is slightly less than the width of the film thus resulting in the major length of the film, i.e., the length of the film extending between its trailing end and its leading end, being bowed as it is being withdrawn or uncoiled from or being rewound upon the film spool, thereby facilitating the movement of the edges of the film under the annular flanges. The passageway is unobstructed thus permitting the entry of ambient light into the interior of the housing. However, the roll of film is protected from exposure by ambient light by (1) a sheet of opaque material which is secured to at least the outermost convolution and preferably the outer two convolutions of film upon the film spool, (2) the collars, and (3) the annular flanges. The passageway is configured such that one merely has to rotate the film spool in a predetermined direction relative to the housing in order to move the leading end of the film into and through the passageway so that it may be manually grasped and connected to a film advancing mechanism of a camera or film processor.

An object of the invention is to provide a housing of a photographic film assemblage with a passageway which is configured so as to allow the movement therethrough of a leading end of a roll of film merely by relative rotation between the housing and the roll of film.

Another object of the invention is to provide a housing of a photographic film assemblage with a passageway which is configured to bow a length of film transversely so as to facilitate the movement of the film from and to a film spool which has a pair of annular flanges that limit the maximum diameter of the film on the film spool.

Other objects of the invention will in part be obvious and will in part appear hereinafter.

The invention accordingly comprises the photographic film assemblage possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
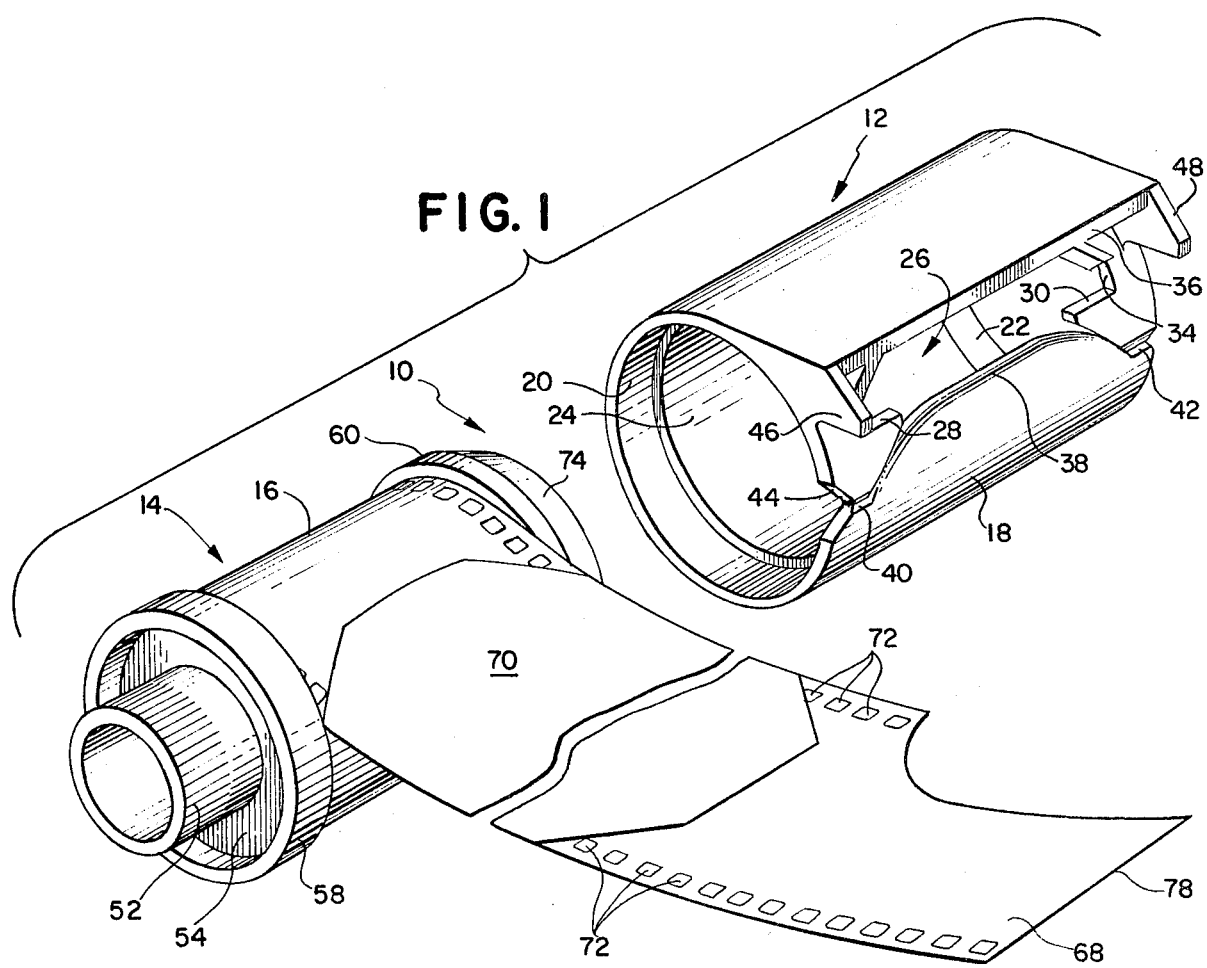
FIG. 1 is a partially exploded perspective view of a photographic film assemblage which incorporates the instant invention.

Reference is now made to the drawings wherein is shown a photographic film assemblage 10 including a housing 12 which may or may not be opaque, a hollow film spool 14 and a length of photographic film 16.

The housing 12 has a generally cylindrically configured wall 18 which is adapted to be received by conventional 35 mm cameras. The interior surface of the wall 18 is recessed at 20 and 22 so as to define the ends of an intermediate wall portion 24 of increased thickness. A film withdrawal slot or passageway 26 is located in the wall 18 and is defined in part by a pair of laterally spaced, horizontally extending surfaces 28 and 30, a vertical surface 32 and 34 extending upwardly from the surfaces 28 and 30, respectively, a generally planar upper surface 36, and a gently curved lower surface 38. The opposite ends of the lower surface are terminated by horizontal shoulders 40 and 42. The shoulder 40 extends into a V-shaped slot 44 while the shoulder 42 extends to the righthand end (as viewed in FIG. 2) of the housing 12. Thus, the housing 12, which may be molded from any suitable material such as ABS (acrylonitrile-butadiene-styrene) is split longitudinally by the V-shaped slot 44, the shoulders 40 and 42 and the passageway 26 such that its diameter may be temporarily enlarged during assembly of the film assemblage 10. A pair of protrusions 46 and 48 extend forwardly from the opposite ends of the surface 36 and function to engage fixed camera structure so as to properly position the film assemblage 10 during loading thereof into a camera and to prevent its rotation during the withdrawal of the film 16.

The film spool 14, which is opaque, and may be molded from ABS, includes a cylindrically configured spindle 50 having a serrated end 52 and a pair of spaced annular collars 54 and 56 which are integral therewith and which extend radially therefrom. An annular flange 58 extends inwardly from the periphery of the collar 54 so as to receive the lefthand end of the roll of film 16, and a similar flange 60 extends from the periphery of the collar 56 toward the flange 58 so as to receive the righthand end of the roll of film 16. So structured, the flanges 58 and 60 function to (1) limit the maximum diameter of the roll of film 16, (2) keep the film 16 from engaging the interior surface of the housing 12, and (3) prevent the passage of light between the facing surfaces of the collars 54 and 56 and the opposite edges of the film 16. A pair of drive surfaces or tabs 62 and 64 extend inwardly towards each other inside of the left end of the spindle 50 while a tab 66 extends across the opposite end of the spindle 50. The tabs 62 and 64 and the tab 66 are adapted to be engaged by a camera or a film processor mechanism for winding the film 16 upon the film spool 14.

The film 16 includes a trailing end (not shown) which is attached to the spindle 50 and a tapered leading end 68 which is adapted to be attached to a film advance mechanism of a camera or film processor. A strip of opaque material 70, e.g., Condulon, is secured in overlaying relation to the emulsion side of a length of the film 16, preferably that portion of the film excluding the leading end 68 which comprises the outermost two convolutions of the roll of film 16. The opaque material 70 is secured to the film 16 at all locations except between the two longitudinally extending rows of sprocket holes 72 in the film 16 thus insuring that it does not interfere with the movement of a cog of a film advance mechanism into the sprocket hole 72. The width of the opaque material 70 is substantially equal to the width of the film 16. The width of the film 16 is substantially equal to the spacing between the facing surfaces of the collars 54 and 56. Further, the width of the film 16 is greater than the distance between the facing surfaces of the flanges 58 and 60 which, in turn, is greater than the width of the passageway 26 as measured between the vertical surfaces 32 and 34. In one prototype constructed in accordance with the instant invention, the width of the film 16 was 34.97 mm, the distance between the facing surfaces of the collars 54 and 56 was 35.20 mm, the distance between the facing surfaces of the annular flanges 58 and 60 was 34.20 mm, and the width of the passageway 26 was 34.04 mm.

During assembly of the film assemblage 10 a strip of adhesive tape is folded in two such that the spindle is secured in the bight of the fold and the remaining facing surfaces of the strip are adhered to each other except for the two end portions which are left spaced apart, much like the arms of the letter "Y". The film spool 14 is then moved into the end of the housing 12 having the recessed portion 20. During such movement a chamfered portion 74 of the collar 56 engages the lefthand end of the housing 12 and spreads it to a diameter which permits entry of the film spool 14 into the housing 12. Also, during such movement, the vertical leg of the aforementioned "Y" is passed through the V-shaped groove 44 in the wall 18 of the housing 12. Immediately after the collar 56 passes the righthand edge of the intermediate section 24 of the housing 12, as viewed in FIG. 2, the resiliency of the housing 12 causes it to snap back into its original position thereby capturing the film spool 14. Next, the trailing end of a length of unexposed film is placed between the arms of the "Y" configured adhesive material and the arms then moved into contact with the film thereby securing the latter to the film spool 14. The film spool 14 is then driven in a counterclockwise manner until a predetermined length of film 16 plus the leading end 68 is wound upon the spool 14. During such winding, the reduced width of the slot 26 relative to the width of the film bows the film laterally, i.e., from side-to-side, thereby easing it between and under the inwardly facing flanges 58 and 60 where it resumes its substantially flat (widthwise) condition. The leading end 68 of the film is then separated from the main supply of film and completely wound into the housing 12. As mentioned hereinbefore, the leading end 68 of the film 16 is slightly tapered, longitudinally, such that it is not constrained by the annular flanges 58 and 60, as is the outer convolution of film 16. Accordingly, the only restraint on the leading end 68 of the film 16 trying to move away from the roll of film is the interior surface of the housing 12. The film assemblage 10 may then be hermetically packaged for shipment to a retail outlet.

After the film assemblage 10 has been removed from its package, it may be allowed to sit in the ambient light for a period of time without fear that the film 16 will be fogged, despite the fact that the ambient light is free to enter the housing 12 via the passageway 26. This is because the strip of opaque material 70 prevents the passage of ambient light through the outermost convolution(s) of film or through the sprocket holes 72. Further, the annular flanges 58 and 60 prevent the ambient light from passing between the facing surfaces of the annular collars 54 and 56 and the sides of the roll of film 16 while the collars 54 and 56 prevent ambient light from entering the opposite ends of the housing 12 and directly striking the edges of the roll of film.

Figure 2:
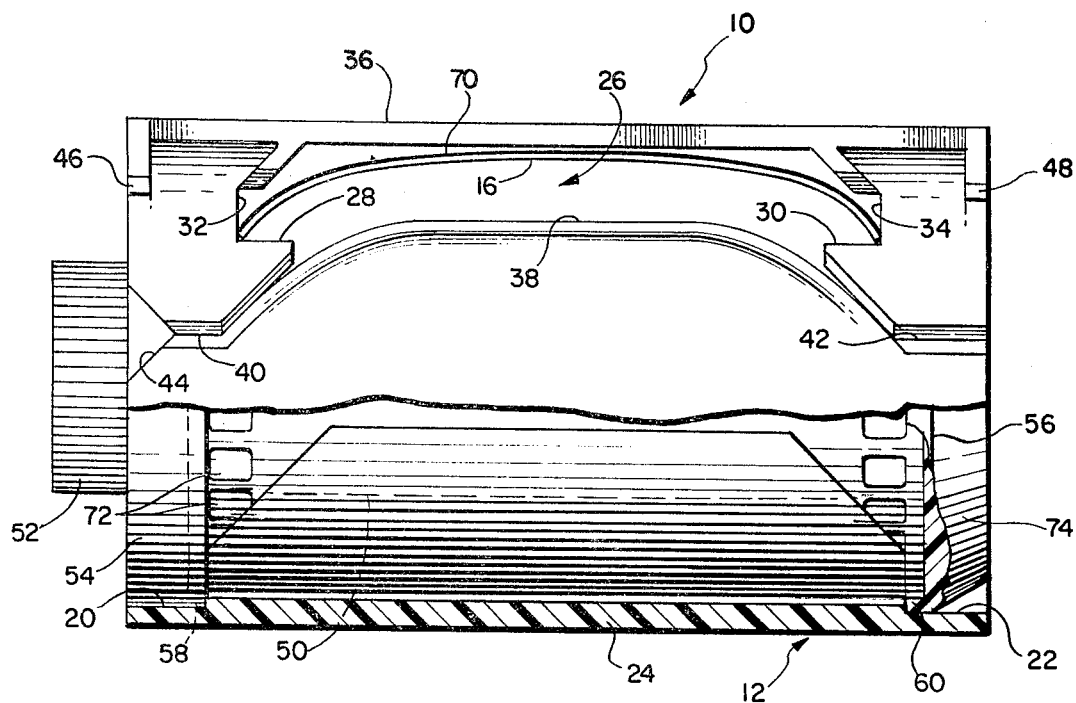
FIG. 2 is an enlarged elevational side view, partly in section, showing the film assemblage of FIG. 1 in an assembled state.

When it is desired to load the film assemblage into a camera for exposure of the film 16, or into a processor for processing exposed film, one merely rotates the film spool 14 relative to the housing 12 in order to gain access to the leading end 68 of the film 16. Specifically, one merely holds the housing 12 in one hand and rotates the film spool 14 via the serrated end 52 with the other hand in a clockwise direction, as viewed in FIG. 3, until the leading end 68 emerges from within the housing 12. Stated another way, as the film spool 14 is rotated in a clockwise direction, the leading end 68, regardless of its original position within the housing 12, eventually approaches the passageway 26 where it is no longer constrained by the curved interior surface of the housing 12 to move in a circular path. To the contrary, the only restraint now on the leading end 68 of the film is the relative straight interior surface of the planar upper surface 36. Since the normal tendency of the leading end 68 of the film 16 is to unwind itself, i.e., move away from the rest of the roll, it follows the surface 36 until it exits from the passageway 26. As the film 16 is being unwound from the film spool 14, it is slightly bowed by the annular flanges 58 and 60. The film 16 is further bowed by the constraints put on its edges by the juncture between the horizontal and vertical surfaces 28 and 32 on one side of the passageway 26 and the horizontal and vertical surfaces 30 and 34, respectively, on the opposite side of the passageway 26, as best seen in FIG. 2. Thus constrained, the only portions of the film 16 which contact the housing 12 are its lateral edges, again as shown in FIG. 2.

Figure 3:
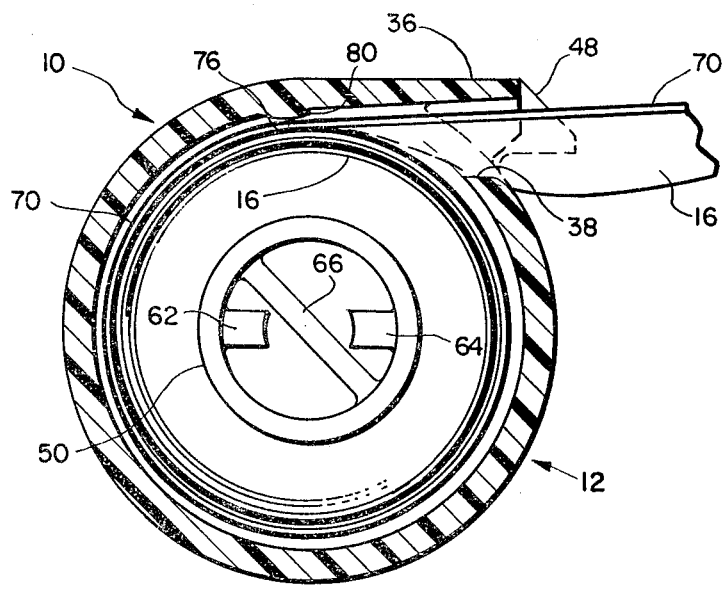
FIG. 3 is an enlarged end view, partly in section, of the film assemblage of FIG. 2 with only a few convolutions of film being shown for reasons of clarity.

As will be noted in FIG. 3, the housing 12 is provided with a longitudinally extending, gently curved bump 76 which functions to guide the edge 78 of the leading end 68 of the film over any flashing which may occur in the molding operation at location 80 which represents the juncture between two molds.

Since certain changes may be made in the above-described photographic film assemblage without departing from the scope of the invention herein involved, it is intended that all matter contained in the above description or shown in the accompanying drawings shall be interpreted as illustrative and not in a limiting sense.

What is claimed is:

1. A photographic film assemblage comprising:
a film spool;
a strip of photographic film coiled about said film spool, said film having a leading end which is adapted to be attached to a film advance apparatus;
means for protecting said film from premature exposure by ambient light, said exposure protecting means comprising a sheet of opaque material secured in overlaying relation to at least the entire length of an outer convolution of said film, a pair of spaced collars located on said film spool, said collars being spaced from each other by a distance substantially equal to the width of said film, and an annular flange extending inwardly from each of said collars into overlaying relation with the edges of said film; and
a housing for rotatably supporting said film spool and said film, said housing including means defining a passageway through which said leading end of said film may be freely advanced to the exterior of said housing and into the ambient light by rotating said film spool relative to said housing, said passageway has a width less than the width of said film thereby causing said film to be bowed widthwise prior to being wound upon said film spool.

2. A photographic film assemblage as defined in claim 1 wherein the width of said passageway is less than the distance between facing surfaces of said annular flanges.

3. A photographic film assemblage comprising:

a film spool having a pair of spaced collars for confining therebetween the opposite sides of a roll of film, and an annular flange extending from a face of each of said collars toward each other so as to overlay the edges of the outermost convolution of a roll of film and control its maximum diameter;

a strip of photographic film coiled about said film spool with its opposite edges confined between said collars and with the edges of the outermost convolution of said film being encompassed by said annular flanges, said film having a leading end which is adapted to be attached to a film advance mechanism; and a housing for rotatably supporting said film spool and said film, said housing having means defining a passageway through which said film may be advanced to the exterior of said housing via said passageway, said passageway having a width less than the width of said film whereby said film is bowed transversely as it passes through said passageway thereby facilitating the movement of said film under and out from under said annular flanges.

* * * * *